March 18, 1947.  V. A. FINLEY  2,417,476
HYDRAULIC PISTON RETURN STOP
Filed Jan. 14, 1946
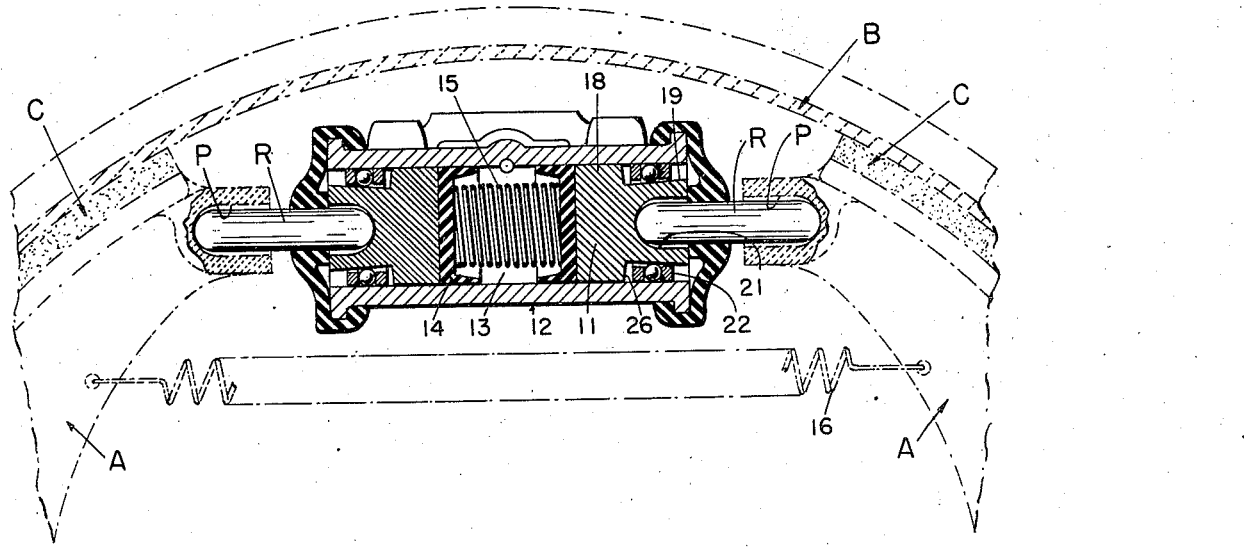
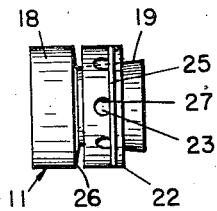
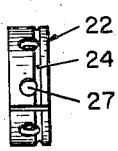
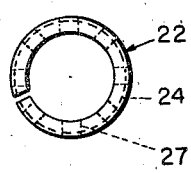
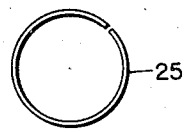
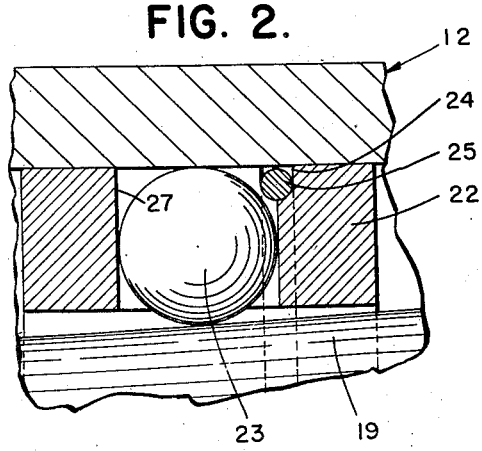
INVENTOR
VIRGIL A. FINLEY
BY
ATTORNEY Patented Mar. 18, 1947

2,417,476

UNITED STATES PATENT OFFICE 2,417,476

HYDRAULIC PISTON RETURN STOP

Virgil A. Finley, Long Beach, Calif.

Application January 14, 1946, Serial No. 641,136

2 Claims. (Cl. 188—79.5)

This invention relates to an automatically adjustable piston return stop means for use particularly with hydraulic actuating means for motor vehicle brakes.

One object of my invention is to provide automatic means for compensating for the wear in the brake linings particularly in motor vehicle wheel brakes. Another object is to provide an automatic return stop means compensating for brake wear which may be installed in the ordinary types of hydraulic brake operating cylinders without the necessity of making any changes in the general arrangement thereof.

These and other objects are attained by my invention which will be understood from the following description, reference being made to the accompanying drawing, in which:

Fig. 1 is a side elevational view partly in section of an hydraulic brake cylinder showing the application of my device to a brake cylinder;

Fig. 2 is an enlarged fragmentary view showing the stop mechanism;

Fig. 3 is a side elevational view showing the assembled piston and stop members;

Fig. 4 is a side elevational view showing the split ring member;

Fig. 5 is an end elevational view of the split ring member;

Fig. 6 is an elevational view of a snap ring used on the ring.

Referring particularly to Fig. 1, my device is adapted to be used with a conventional arrangement for operating brakes on motor vehicles, which consists of segmental arms A pivoted at one end to move in and out against a brake drum B, the contacting surface of the arms having a brake lining C. The free ends of the arms A are operated by means of the rods R which fit in pockets P in the free ends of the arms A. The other ends of these rods R are adapted to be engaged by the two opposed piston members 11 which operate in the hydraulic cylinder 12, the working chamber 13 being disposed between the two piston members with intermediate rubber cups 14, held apart by a spring 15. The hydraulic fluid is forced by a master cylinder actuated by a foot pedal, into the working chamber 13, causing the cups to press outwardly against the inner ends of the piston members and thus through the rods R pressing the brake lining C against the brake drum B. A tension spring 16 is connected between the two arms A to hold the moving parts in contact.

The piston member 11 consists of a cylindrical portion 18 which fits the cylinder walls of the working chamber 13. An outer conical extension 19 is provided on each piston member having its smaller diameter adjoining the cylindrical portion 18, forming the shoulder 26, recesses 21 being provided in the outer end for engagement by the rod R. A split cylindrical ring 22 which frictionally engages the extension of the walls of the working chamber 13, and is adapted to move in the space between the cylinder walls and the conical extension 19 of the piston member 11, this split ring being provided with a number of holes 27 through its periphery for holding steel balls 23. A snap ring 25 is conveniently placed in a groove 24 formed in the outer surface of the split ring 22 and adapted to hold the balls in place during the assembly of the device.

When the piston members 11 are forced apart by the hydraulic fluid in the working chamber the rods R in the recesses 21 are pressed outwardly to force the brake lining against the drum. The split ring 22 carrying the balls 23 is carried outwardly by the shoulder 26 at the base of the conical portion 19 of the piston member, the amount of this movement being the amount permitted by the desired free space between the brake lining and the drum when the brakes are free. When the hydraulic pressure is released from the working chamber the spring 16 pulls the arms A toward each other causing the piston members to move toward each other until the conical surface forces the balls 23 into engagement with the extension of the walls of the working chamber 13. This clutching action prevents the piston member from returning for a greater distance than the desired free space between the brake lining and the drum and on a repeated action of the hydraulic braking mechanism the piston starts from this stopped position. As the brake lining is worn down, the split ring 22 is moved farther outwardly in the working chamber and the piston member is prevented from returning farther than the amount of free space between the brake lining and the drum. In this way the wear on the brake lining is automatically compensated so that when the hydraulic fluid is forced into the cylinder, the moving piston members start from a fixed position determined by the split ring position.

The split ring is preferably made with a relatively long cylindrical outer surface in contact with working chamber walls so that it will maintain a true position relative to the cylinder walls with no misalignment of the parts.

Since practically all modern motor cars are equipped with hydraulic brake operating cylinders operating each brake band, it is possible to apply my device to existing equipment by merely replacing the ordinary piston with my specially formed piston member including the split ring with the balls for engaging the conical neck of the piston member, thus making the hydraulic cylinder automatically compensating for the wear on the brake lining.

I claim:

1. In an hydraulic cylinder having an elongated cylindrical working chamber, a piston member consisting of a cylindrical portion adapted to fit the working chamber walls; a conical extension from said cylindrical portion having its smaller diameter adjoining said cylindrical portion and aligned axially therewith, and having means at the larger diameter end for operative connection to a rod member; a split ring member provided with peripheral holes adapted to hold ball members therein, and having a groove adjacent the edges of said holes on the outer wall, said ring being adapted to slide in and frictionally engage the cylinder walls of said working chamber, ball members having larger diameters than the thickness of said ring member loosely fitting in said peripheral holes, and a snap ring in said groove adapted to hold said ball members in place.

2. In an hydraulic cylinder having an elongated cylindrical working chamber, a piston member consisting of a cylindrical portion adapted to fit the working chamber walls; a conical extension from said cylindrical portion having its smaller diameter adjoining said cylindrical portion and axially aligned therewith forming an abutting shoulder for a ring member around said conical portion, and having means at the larger diameter end for operative connection to a rod member; a split ring member on said conical portion, provided with peripheral holes adapted to hold ball members therein, said ring being adapted to slide in and frictionally engage the cylinder walls of said working chamber, ball members having larger diameters than the thickness of said ring member loosely fitting in said peripheral holes, said ball members being adapted to engage said conical portion at an intermediate position in its length to stop the movement of said piston in one direction in said working chamber while permitting unrestricted movement in the opposite direction.

VIRGIL A. FINLEY.

REFERENCES CITED

The following references are of record in the file of this patent:

UNITED STATES PATENTS

| Number | Name | Date |
|---|---|---|
| 1,808,079 | Seddon et al. | June 2, 1931 |
| 2,358,740 | Iversen | Sept. 19, 1944 |